United States Patent
Littmann et al.

(10) Patent No.: US 10,343,135 B1
(45) Date of Patent: Jul. 9, 2019

(54) MANUFACTURING PLANT FOR HIGH-PRESSURE ETHYLENE POLYMERIZATION AND METHOD FOR EMERGENCY SHUTDOWN

(71) Applicant: Basell Polyolefine GmbH, Wesseling (DE)

(72) Inventors: Dieter Littmann, Muecke (DE);
Andre-Armand Finette, Cologne (DE);
Christoph Wolf, Pulheim-Dansweiler (DE); Michael Deuerling, Weilerswist (DE); Juergen Peter Mohrbutter, Alfter (DE); Danir Khayrullin, Bruehl (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 16/144,627

(22) Filed: Sep. 27, 2018

(30) Foreign Application Priority Data

Jan. 2, 2018 (EP) .................................. 18150014

(51) Int. Cl.
| | |
|---|---|
| *C08F 210/02* | (2006.01) |
| *C08F 210/16* | (2006.01) |
| *F16L 3/23* | (2006.01) |
| *B01J 19/24* | (2006.01) |
| *F16L 43/00* | (2006.01) |

(52) U.S. Cl.
CPC ......... *B01J 19/2415* (2013.01); *C08F 210/02* (2013.01); *C08F 210/16* (2013.01); *F16L 3/23* (2013.01); *F16L 43/001* (2013.01); *B01J 2219/00033* (2013.01); *C08F 2500/08* (2013.01)

(58) Field of Classification Search
CPC ...... C08F 2/01; C08F 2/34; C08F 2/38; C08F 110/02; B01J 19/2415
USPC .......................................................... 526/64
See application file for complete search history.

(56) References Cited

U.S. PATENT DOCUMENTS

| | | | |
|---|---|---|---|
| 4,326,048 A | 4/1982 | Stevens et al. | |
| 8,399,586 B2 * | 3/2013 | Kiss ........................ | C08F 10/02 422/132 |
| 2004/0013588 A1 | 1/2004 | Groos et al. | |
| 2004/0247493 A1 * | 12/2004 | Donck ................. | B01J 19/2415 422/132 |

FOREIGN PATENT DOCUMENTS

WO          0201308 A2     1/2002

OTHER PUBLICATIONS

European Search Report for EP Application No. 18150014.1 dated May 16, 2018.

* cited by examiner

*Primary Examiner* — William K Cheung (57) ABSTRACT

The present disclosure relates to a manufacturing plant for high-pressure polymerization having a layered tubular reactor and a method for an emergency shutdown in said manufacturing plant. The present disclosure also relates to a process for manufacturing LDPE using said layered tubular reactor.

14 Claims, 4 Drawing Sheets

MANUFACTURING PLANT FOR HIGH-PRESSURE ETHYLENE POLYMERIZATION AND METHOD FOR EMERGENCY SHUTDOWN

CROSS-REFERENCE TO RELATED APPLICATIONS

This application claims the benefit of priority to European Patent Application No. 18150014.1 filed on Jan. 2, 2018, which is incorporated herein by reference in its entirety.

FIELD OF THE INVENTION

The present disclosure relates to a manufacturing plant for high-pressure ethylene polymerization and a method for an emergency shutdown in said manufacturing plant. The present disclosure also relates to a process for manufacturing LDPE (low density polyethylene) in such a manufacturing plant.

BACKGROUND OF THE INVENTION

Ethylene polymers may be formed in high-pressure polymerization processes. Individual steps in such processes are the compression of the reaction mixture to the reactor pressure, introduction of an initiator in at least one stage, polymerization while removing exothermic heat of reaction, product separation and further processing. For said processes, different types of reactor design may be used. One class of reactors to form low density ethylene-based polymers are tubular reactors.

A common set-up of a plant for preparing low density polyethylene comprises, besides the polymerization reactor, further equipment. The reaction components may be pressurized by a combination of two compressors, a primary compressor and a secondary compressor. At the end of the polymerization sequence, a high-pressure polymerization unit may further include apparatuses like extruders and granulators for pelletizing the obtained polymer. Furthermore, such a polymerization unit may also comprise means for feeding monomers and comonomers, free-radical initiators, chain transfer agents or other substances at one or more positions to the polymerization reaction. A process and an apparatus for the manufacture of ethylene polymers and copolymers under high pressures are for example disclosed in WO 2007/018871 A1.

Because tubular rectors for manufacturing LDPE are too long to be constructed as one long straight tube, the tubular reactor has to be spatially arranged. A common arrangement is that the tubular reactor is helically constructed; that means, the compressed reaction mixture advances in a kind of spiraling movement. One possibility of implementing such a design is that the tubular rector is located within a rectangular chamber and the helically arranged reactor tubes are attached to the walls of the chamber. Another possibility is to erect a scaffold and have the tubular rector spiraling along the scaffold.

The polymerization process in a LDPE reactor may be carried out at temperatures from 100° C. to 350° C. and high pressures which can reach 350 MPa. Such high temperatures and pressures require special technology for the process to be handled in a safe and reliable manner. Technical issues in handling ethylene at high pressures are, for example, described in Chem. Ing. Tech. 67 (1995), pages 862 to 864. It is stated that ethylene decomposes rapidly in an explosive manner under certain temperature and pressure conditions to give soot, methane and hydrogen. This undesired reaction occurs repeatedly in the high-pressure polymerization of ethylene. The drastic increase in pressure and temperature associated therewith represents a considerable potential risk for the operational safety of the production plants.

A possible solution for preventing a drastic increase in pressure and temperature of this type involves installing rupture discs or emergency pressure-relief valves. U.S. Pat. No. 4,255,387 discloses a high-pressure tubular reactor containing a plurality of tubular sections interconnected in series by means of connection devices, which reactor contains one or more reaction zones. Within each reaction zone, a single rupture disc device is positioned from about 24 to about 40 feet downstream from the reaction zone inlet. WO 02/01308 A2, for example, discloses a specific hydraulically controlled pressure relief valve which allows a particularly fast opening of the pressure relief valve in case of sudden changes in pressure or temperature. It is technically possible to handle such thermal runaways or explosive decompositions of ethylene within the polymerization reactor, although these situations should be avoided since thermal runaways or explosive decompositions of ethylene within the polymerization reactor lead to a shut-down of the polymerization plant with a possible emission of ethylene into the environment and loss of production.

Nonetheless, since it is not always possible to prevent thermal runaways or explosive decomposition, the equipment of the manufacturing plant has to withstand the mechanical forces which occur when an emergency shut-down is carried out. Furthermore, the equipment should allow for compensating the forces which might apply when the plant is brought into operation or shut down; i.e. when pressure and temperature are changed between operational state and ambient conditions.

There is accordingly a need to provide an improved design for arranging a tubular reactor of a manufacturing plant for high-pressure ethylene polymerization. The tubular reactor should allow efficient preparation of ethylene polymers and the costs of building, installing and operating the manufacturing plant should be reduced. It has hence to be ensured that the parts of the manufacturing plant can withstand the forces which might apply with respect to putting into operation or shutting down the manufacturing plant, even in emergency situations, and to compensate and endure, for example, pressure fluctuations and vibrations which might occur during regular operation of the manufacturing plant.

SUMMARY OF THE INVENTION

The present disclosure provides a manufacturing plant for high-pressure ethylene polymerization comprising a layered tubular reactor, the layered tubular reactor comprising interconnected first tubings for conveying a high-pressure reaction mixture, which first tubings are straight first tubes or first bends, wherein the interconnected first tubings form at least one meandering first pipeline and at least one first pressure relief valve is connected to said first pipeline, the layered tubular reactor further comprising interconnected second tubings for conveying a high-pressure reaction mixture, which second tubings are straight second tubes or second bends, wherein the interconnected second tubings form at least one meandering second pipeline and at least one second pressure relief valve is connected to said second pipeline, wherein the at least one first pipeline is arranged in a vertical first layer and the at least one second pipeline is arranged in a vertical second layer, and wherein the first layer is spatially separated from the second layer.

In some embodiments, the manufacturing plant has a flooring and the first pressure relief valve is attached to a first support structure which is fastened to the flooring and/or wherein the second pressure relief valve is attached to a second support structure which is fastened to the flooring.

In some embodiments, the first and second support structures comprise or are concrete slabs and/or metal plates anchored to said flooring.

In some embodiments, at least some of the first bends connect straight first tubes arranged at different distances from the flooring and/or wherein at least some of the second bends connect straight second tubes arranged at different distances from the flooring.

In some embodiments, the first tubings have a first average tube inside diameter and the first bends are shaped in a semicircle having a first centerline radius, wherein the first centerline radius is not more than the tenfold of the first average tube inside diameter and/or the second tubings have a second average tube inside diameter and the second bends are shaped in a semicircle having a second centerline radius, wherein the second centerline radius is not more than the tenfold of the second average tube inside diameter.

In some embodiments, a transit pipe for conveying a high-pressure reaction mixture connects the first layer with the second layer and the first layer and the second layer are arranged side by side and/or next to each other.

In some embodiments, the first tubings intersect a first plane along their cavities for conveying a reaction mixture and/or the second tubings intersect a second plane along their tube cavities for conveying a reaction mixture.

In some embodiments, the one or more first pipelines are connected to a first scaffold anchored to the flooring and the one or more second pipelines are connected to the first scaffold or to a second scaffold anchored to the flooring, wherein the first pressure relief valve and the second pressure relief valve are spaced apart from said first scaffold and/or second scaffold.

In some embodiments, the first pressure relief valve and the second pressure relief valve are connected to a pressure-relief compartment comprising a cooling agent and a vent.

In some embodiments, the manufacturing plant further comprises interconnected third tubings for conveying a high-pressure reaction mixture and the interconnected third tubings form at least one meandering third pipeline, and wherein the manufacturing plant also comprises interconnected fourth tubings for conveying a high-pressure reaction mixture and the interconnected fourth tubings form at least one meandering fourth pipeline, wherein the at least one third pipeline is arranged in a third vertical layer and the at least one fourth pipeline is arranged in a fourth vertical layer, wherein the third layer is spaced at a distance from the first, second and fourth layer, and the fourth layer is spaced at a distance from the first, second and third layer.

In some embodiments, the first layer as an upper end pointing away from the flooring as well as a lower end pointing towards the flooring and a stationary first side end and an adaptive second side end, wherein the stationary first side end is closer to the first pressure relief valve than the adaptive second side end and/or one first tubing located at the stationary first side end is connected to the first pressure relief valve, wherein the adaptive second side end is mounted in such a way that it can expand and/or stretch away from the stationary first side end when temperature increases.

In some embodiments, the manufacturing plant further comprises a pre-heater having interconnected pre-heating tubings for conveying a high-pressure reaction gas composition, which pre-heating tubings are straight pre-heating tubes or pre-heating bends, wherein the interconnected pre-heating tubings form a pre-heating pipeline and at least one pre-heating pressure relief valve is connected to said pre-heating pipeline, wherein the pre-heating pipeline is arranged in a vertical pre-heating layer comprising a pre-heating zone, wherein the pre-heating pressure relief valve is attached to a pre-heating support structure that is fastened to the flooring.

In some embodiments, the first layer comprises pipelines of at least one first reaction zone and the second layer comprises pipelines at least one second reaction zone.

The present disclosure further provides a method for carrying out an emergency shutdown in a manufacturing plant as describe in the above, comprising the steps of
I) polymerizing ethylene or copolymerizing ethylene and one or more comonomers at a temperature of 100° C. to 350° C. and a pressure of 110 MPa to 500 MPa,
II) stopping the feeding of the reaction gas composition into the first pipeline, and
III) reducing the pressure within the one or more first pipelines and the one or more second pipelines using the first pressure relief valve and the second first pressure relief valve, wherein the first pressure relief valve and the second pressure relief valve release a reaction mixture comprising ethylene into a pressure-relief compartment having a cooling agent.

The present disclosure further provides a process for preparing an ethylene polymer in a manufacturing plant according to any of the claims 1 to 13 comprising polymerizing ethylene or copolymerizing ethylene and one or more comonomers at a temperature of 100° C. to 350° C. and a pressure of 110 MPa to 500 MPa.

DETAILED DESCRIPTION OF THE INVENTION

The present disclosure relates to a manufacturing plant for high-pressure ethylene polymerization comprising a tubular reactor and to a process for preparing an ethylene polymer in such a manufacturing plant. The high-pressure polymerization may be carried out at pressures of from 110 MPa to 500 MPa, or at pressures of from 160 MPa to 350 MPa, or at pressures of from 200 MPa to 330 MPa. The polymerization temperatures may be in the range of from 100° C. to 350° C., or in the range of from 180° C. to 340° C., or from 200° C. to 330° C.

In an embodiment of the manufacturing plant, the monomers are brought to the polymerization pressure by one or more compressors in a sequence of compression stages, the compressed monomers are optionally passed through a pre-heater or a pre-cooler and transferred into the polymerization reactor which is optionally cooled by cooling jackets. In addition, a reaction mixture obtained by the polymerization leaves the reactor through a pressure control valve and is optionally cooled by an post reactor cooler, the reaction mixture is separated into polymeric and gaseous components in two or more stages, where the gaseous components separated off in a first stage at an absolute pressure of from 15 MPa to 50 MPa are recycled to the one or more compressors via a high-pressure gas recycle line and the gaseous components separated off in a second stage at an absolute pressure in the range of from 0.1 MPa to 0.5 MPa are recycled to the first stage of the sequence of compression stages via a low-pressure gas recycle line, and the polymeric components obtained by the polymerization are transformed into pellets.

The high-pressure polymerization may be a homopolymerization of ethylene or a copolymerization of ethylene with one or more other monomers, provided that these monomers are free-radically copolymerizable with ethylene under high pressure. Examples of copolymerizable monomers for use in the present technology are α,β-unsaturated $C_3$-$C_8$-carboxylic acids, derivatives of α,β-unsaturated $C_3$-$C_8$-carboxylic acids, e.g. unsaturated $C_3$-$C_{15}$-carboxylic esters or anhydrides, and 1-olefins. In addition, vinyl carboxylates, such as vinyl acetate, can be used as comonomers. In an embodiment, propene, 1-butene, 1-hexene, acrylic acid, n-butyl acrylate, tert-butyl acrylate, 2-ethylhexyl acrylate, vinyl acetate or vinyl propionate are used as comonomer.

In the case of copolymerization, the proportion of comonomer or comonomers in the reaction mixture may be from 1 to 50% by weight, or from 3 to 40% by weight, based on the amounts of monomers, i.e. the sum of ethylene and other monomers. Depending on the type of comonomer, it can be possible to feed the comonomers at more than one point to the reactor set-up. In an embodiment, the comonomers are fed to the suction side of the secondary compressor.

For the purposes of the present disclosure, polymers or polymeric materials are substances which are made up of at least two monomer units. The polymers or polymeric materials may be low density polyethylenes having an average molecular weight Mn of more than 20 000 g/mole. The term "low density polyethylene" (LDPE) includes ethylene homopolymers and ethylene copolymers. The process can also be the preparation of oligomers, waxes and polymers having a molecular weight Mn of less than 20 000 g/mole.

The polymerization may be a radical polymerization carried out in the presence of free-radical polymerization initiators. Possible initiators for starting the polymerization in the respective reaction zones are in general any substances that can produce radical species under the conditions in the polymerization reactor, for example, oxygen, air, azo compounds or peroxidic polymerization initiators. In an embodiment of the disclosure, the polymerization is carried out by using oxygen, either fed in the form of pure $O_2$ or as air. In case of initiating the polymerization with oxygen, the initiator may be first mixed with the ethylene feed and then fed to the reactor. In such a case, it is not only possible to feed a stream comprising monomer and oxygen to the beginning of the polymerization reactor but also to one or more points along the reactor creating two or more reaction zones. Initiation using organic peroxides or azo compounds also represents an embodiment of the present disclosure. It is possible to use either individual initiators or mixtures of various initiators. A large range of initiators, such as peroxides, are commercially available, for example the products of Akzo Nobel offered under the trade names Trigonox® or Perkadox®.

In the high-pressure polymerization, the molecular weight of the polymers to be prepared may be altered by the addition of modifiers which act as chain-transfer agents. Examples of modifiers for use in the present technology are hydrogen, aliphatic and olefinic hydrocarbons, e.g. propane, butane, pentane, hexane, cyclohexane, propene, 1-butene, 1-pentene or 1-hexene, ketones such as acetone, methyl ethyl ketone (2-butanone), methyl isobutyl ketone, methyl isoamyl ketone, diethyl ketone or diamyl ketone, aldehydes such as formaldehyde, acetaldehyde or propionaldehyde and saturated aliphatic alcohols such as methanol, ethanol, propanol, isopropanol or butanol. In an embodiment, saturated aliphatic aldehydes such as propionaldehyde, or 1-olefins such as propene, 1-butene or 1-hexene, or aliphatic hydrocarbons such as propane are used.

Appropriate tubular reactors are basically long, thick-walled pipes, which may be from about 0.5 km to 4 km, or from 1 km to 3 km, or from 1.5 km to 2.5 km long. The inner diameter of the pipes may be in the range of from about 30 mm to 120 mm, or from 60 mm to 100 mm. Such tubular reactors may have a length-to-diameter ratio of greater than 1000, or from 10000 to 40000, or from 25000 to 35000.

In an embodiment, the tubular reactor is composed of individual segments. These segments or tubings may be flanged together. The tubings can be straight tubes or the tubings can be bends. The straight tubes may have a length of from 15 m to 20 m. The tubes can be flanged to other tubes, or the tubes can be flanged to a bend. The bends may be 180° bend bends, i.e. bends which are shaped in a semicircle. It is also possible that the bends are formed in a way that more than one bend flanged together, for example two bends flanged together, form a semicircle. In an embodiment, the bends have a small radius; i.e. the centerline radius of the bends is not more than the tenfold of the average inside diameter of the bends, or the centerline radius of the bends is not more than the eightfold of the average inside diameter of the bends, or the centerline radius of the bends is not more than the fivefold of the average inside diameter of the bends.

In an embodiment of the present disclosure, the flanges are arranged such that groups of flanges are aligned on top of each other. Such a group of flanges may be arranged one atop of the other and has at least two flanges, or from 3 to 100 flanges, or from 5 to 60 flanges.

The tubular reactors may have at least two reaction zones, or from 2 to 6 reaction zones, or from 2 to 5 reaction zones. The number of reaction zones is given by the number of feeding points for the initiator. Such a feeding point can, for example, be a feeding point for a solution of azo compounds or organic peroxides. Fresh initiator is added to the reactor, where the initiator decomposes into free radicals and initiates further polymerization. The generated heat of the reaction raises the temperature of the reaction mixture, since more heat is generated than can be removed through the walls of the tubular reactor. The rising temperature increases the rate of decomposition of the free-radical initiators and accelerates polymerization until essentially all of the free-radical initiator is consumed. Thereafter, no further heat is generated and the temperature decreases again since the temperature of the reactor walls is lower than that of the reaction mixture. Accordingly, the part of the tubular reactor downstream of an initiator feeding point in which the temperature rises is the reaction zone, while the part thereafter, in which the temperature decreases again, is predominantly a cooling zone. The amount and nature of added free-radical initiators determines how much the temperature rises and accordingly allows for adjusting that value. The temperature rise may be set to be in the range of from 70° C. to 170° C. in the first reaction zone and 50° C. to 130° C. for the subsequent reaction zones depending on the product specifications and the reactor configuration. In an embodiment, the tubular reactor is equipped with cooling jackets for removing the heat of the reaction. All reaction zones of the tubular reactor may be cooled by cooling jackets.

In an embodiment of the present disclosure, the cooling jackets are arranged on straight tubes. Each of the straight tubes may be equipped with a cooling jacket. Water may be used as a cooling medium. In an embodiment, not each of the straight tubes is supplied individually with the cooling medium but some adjacent straight tubes form a group, for example a group of two, three, four, five or six straight tubes, and this group of straight tubes is supplied with the cooling medium. The cooling medium is then conveyed to the cooling jacket of one of the straight tubes of the group and thereafter passed through the cooling jackets of the other members of the group of straight tubes before being taken away from the tubular reactor.

The compression of the reaction gas composition to the polymerization pressure may be carried out by one or more compressors in a sequence of compression stages, where a primary compressor may first compress the reaction gas composition to a pressure of from 10 MPa to 50 MPa and a secondary compressor, which is sometimes designated as a hyper compressor, further compresses the reaction gas composition to the polymerization pressure of from 110 MPa to 500 MPa. In an embodiment, the primary compressor and the secondary compressor are multistage compressors. It is further possible to separate one or more stages of one or both of these compressors and divide the stages into separated compressors, or a series of one primary compressor and one secondary compressor is used for compressing the reaction gas composition to the polymerization pressure. In such cases, sometimes the whole primary compressor is designated as primary compressor. However, it is also common to designate the one or more first stages of the primary compressor, which compress the recycle gas from the low-pressure product separator to the pressure of the fresh ethylene feed, as the booster compressor and then the one or more subsequent stages as the primary compressor, although the booster compressor and the subsequent stages are part of one apparatus.

In an embodiment of the present disclosure, the production line comprises a pre-heater upstream of the tubular reactor for heating the reaction gas composition to a temperature capable of initiating the polymerization. The pre-heater may be composed of individual segments. These segments or tubings may be flanged together. The pre-heating tubings can be straight tubes or the tubings can be bends. In an embodiment, the straight tubes have a length of from 15 m to 20 m. The tubes can be flanged to other tubes, or the tubes can be flanged to a bend. The bends may be 180° bend bends, i.e. bends which are shaped in a semicircle. It is also possible that the bends are formed in a way that more than one bend is flanged together, for example two bends flanged together, to form a semicircle. In an embodiment, the bends have a small radius; i.e. the centerline radius of the bends is not more than the tenfold of the average inside diameter of the bends, or the centerline radius of the bends is not more than the eightfold of the average inside diameter of the bends, or the centerline radius of the bends is not more than the fivefold of the average inside diameter of the bends. In an embodiment of the present disclosure, the flanges are arranged such that groups of flanges are aligned on top of each other. Such a group of flanges may be arranged one atop of the other and may have at least two flanges, or from 3 to 50 flanges, or from 5 to 30 flanges.

In an embodiment of the present disclosure, the entire reaction gas composition provided by the secondary compressor is fed via a pre-heater to the inlet of the tubular reactor. In another embodiment of the present disclosure, a part of the reaction gas composition compressed by the secondary compressor is fed via the pre-heater to the inlet of the tubular reactor and the remainder of the reaction gas composition compressed by the secondary compressor is fed as one or more side streams to the tubular reactor downstream of the inlet of the tubular reactor. In such a set-up, from 30 to 90% by weight, or from 40 to 70% by weight of the reaction gas composition provided by the secondary compressor may be fed to the inlet of the tubular reactor and from 10 to 70% by weight, or from 30 to 60% by weight of the reaction gas composition provided by the secondary compressor are fed as one or more side streams to the tubular reactor downstream of the inlet of the tubular reactor.

The production line for carrying out the polymerization of the present disclosure comprises, beside the polymerization reactor, two or more gas recycle lines for recycling unreacted monomers into the polymerization process. The reaction mixture obtained in the polymerization reactor is transferred to a first separation vessel, regularly called high-pressure product separator, and separated into a gaseous fraction and a liquid fraction at an absolute pressure of from 15 MPa to 50 MPa. The gaseous fraction withdrawn from the first separation vessel is fed via a high-pressure gas recycle line to the suction side of the secondary compressor. In the high-pressure gas recycle line, the gas may be purified by several purification steps for removing undesired components such as entrained polymer or oligomers. The liquid fraction withdrawn from the first separation vessel, which may still comprises dissolved monomers such as ethylene and comonomers in an amount of about 20 to 40% of weight, is transferred to a second separation vessel, regularly called a low-pressure product separator, and further separated, at reduced pressure, such as at an absolute pressure in the range of from 0.1 MPa to 0.5 MPa, in polymeric and gaseous components. The gaseous fraction withdrawn from the second separation vessel is fed via a so-called low-pressure gas recycle line to the primary compressor, for example to the foremost of the stages. Also, the low-pressure gas recycle line may comprise several purification steps for purifying the gas from undesired components. The production line can further comprise additional separation steps for separating additional gaseous fractions from the reaction mixtures and additional gas recycle lines for feeding such additional gaseous fractions comprising not reacted monomers to one of the compressors, for example in-between the first separation step and the second separation step operating at an intermediate pressure.

In an embodiment, the recycled gas coming from the low-pressure gas recycle line is compressed by the first stages of the primary compressor to the pressure of the fresh feed of ethylenically unsaturated monomers, such as ethylene, and thereafter combined with the fresh gas feed and the combined gases are further compressed in the primary compressor to the pressure of from 10 MPa to 50 MPa. The primary compressor may comprise five or six compression stages, two or three before adding the fresh gas and two or three after adding the fresh gas. The secondary compressor may have two stages; a first stage, which compresses the gas from about 30 MPa to about 120 MPa, and a second stage, which further compresses the gas from about 120 MPa to the final polymerization pressure.

The pressure within the polymerization reactor may be controlled by a pressure control valve, which is arranged at the outlet of the polymerization reactor and through which the reaction mixture leaves the reactor. The pressure control valve can be any valve arrangement which can reduce the pressure of the reaction mixture leaving the reactor to the pressure within the first separation vessel.

In an embodiment of the present disclosure, the production line comprises a post reactor cooler downstream of the polymerization reactor for cooling the reaction mixture. The post reactor cooler can be arranged upstream of the pressure control valve or the post reactor cooler can be arranged downstream of the pressure control valve. The post reactor cooler may be arranged downstream of the pressure control valve. The post reactor cooler may be composed of individual segments. These segments or cooling tubings can be flanged together. The cooling tubings can be straight tubes or the tubings can be bends. In an embodiment, the straight tubes have a length of from 15 m to 20 m. The tubes can be flanged to other tubes, or the tubes can be flanged to a bend. The bends may be 180° bends, i.e. bends which are shaped in a semicircle. It is also possible that the bends are formed in a way that more than one bend flanged together, for example two bends flanged together, form a semicircle. In an embodiment, the bends have a small radius; i.e. the centerline radius of the bends is not more than the tenfold of the average inside diameter of the bends, or the centerline radius of the bends is not more than the eightfold of the average inside diameter of the bends, or the centerline radius of the bends is not more than the fivefold of the average inside diameter of the bends. In an embodiment of the present disclosure, the flanges are arranged such that groups of flanges are aligned on top of each other. Such a group of flanges may be arranged one atop of the other and may have at least two flanges, or from 3 to 80 flanges, or from 5 to 60 flanges.

The tubular reactor may be located in a chamber having a surrounding protective wall.

The polymeric components obtained by the polymerization are finally transformed into pellets, for example by apparatuses like extruders or granulators.

Figure 1:
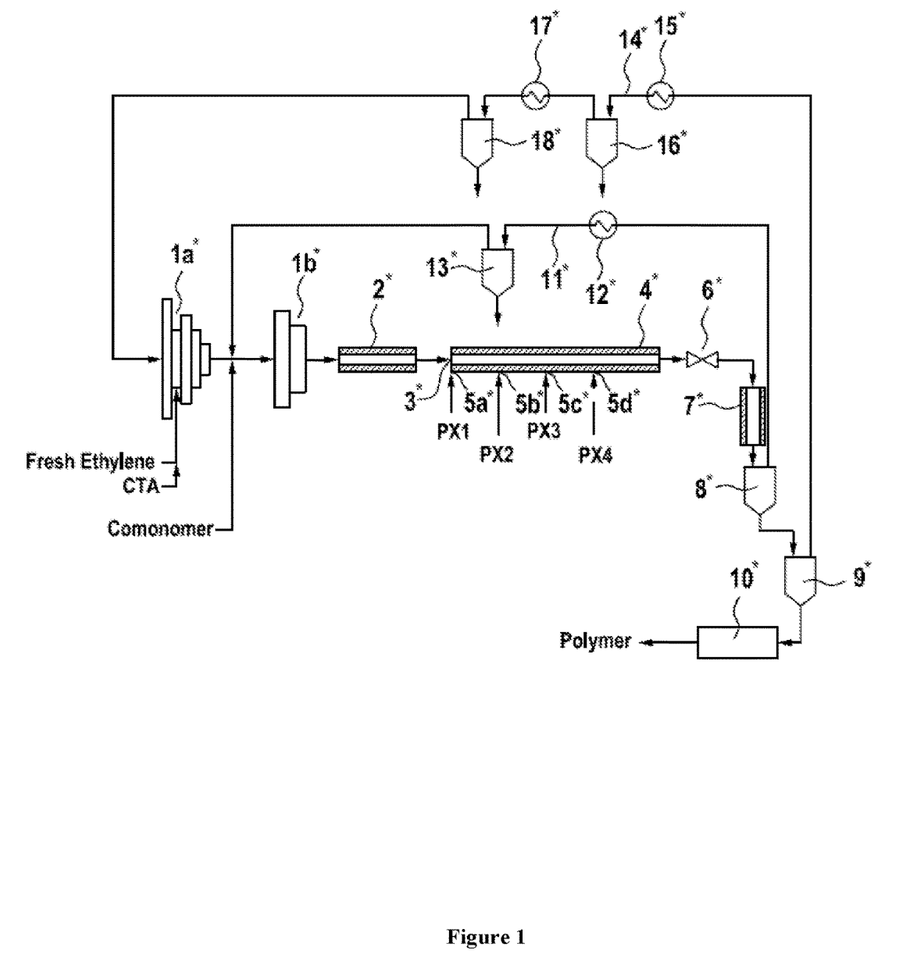
FIG. 1 shows schematically a set-up for carrying out a high-pressure polymerization according to the present disclosure.

FIG. 1 shows schematically a set-up of a manufacturing plant for high-pressure ethylene polymerization comprising a tubular reactor which is continuously operated.

The fresh ethylene, which may be under a pressure of 1.7 MPa, is firstly compressed to a pressure of about 30 MPa by means of a primary compressor (1a*) and then compressed to the reaction pressure of about 300 MPa using a secondary compressor (1b*). Chain transfer agents (CTA) may be added to the primary compressor (1a*) together with the fresh ethylene. Comonomer may be added upstream of the secondary compressor (1b*). The reaction mixture leaving the secondary compressor (1b*) is fed to a pre-heater (2*), where the reaction mixture is preheated to the reaction start temperature of from about 120° C. to 220° C., and then conveyed to the inlet (3*) of the tubular reactor (4*).

The tubular reactor (4*) is basically a long, thick-walled pipe with cooling jackets to remove the liberated heat of reaction from the reaction mixture by means of a coolant circuit (not shown).

The tubular reactor (4*) shown in FIG. 1 has four spatially separated initiator feeding points (5a*), (5b*), (5c*) and (5d*) for feeding initiators or initiator mixtures PX1, PX2, PX3 and PX4 to the reactor and accordingly also four reaction zones. By feeding free-radical initiators, which decompose at the temperature of the reaction mixture, to the tubular reactor the polymerization reaction starts.

The reaction mixture leaves the tubular reactor (4*) through a pressure control valve (6*) and passes a post reactor cooler (7*). Thereafter, the resulting polymer is separated off from unreacted ethylene and other low molecular weight compounds (monomers, oligomers, polymers, additives, solvent, etc.) by means of a first separation vessel (8*) and a second separation vessel (9*), discharged and pelletized via an extruder and granulator (10*).

The ethylene and comonomers which have been separated off in the first separation vessel (8*) are fed back to the inlet end of the tubular reactor (4*) in the high-pressure circuit (11*) at 30 MPa. In the high-pressure circuit (11*), the gaseous material separated from the reaction mixture is first freed from other constituents in at least one purification stage and then added to the monomer stream between primary compressor (1a*) and secondary compressor (1b*). FIG. 1 shows one purification stage consisting of a heat exchanger (12*) and a separator (13*). It is however also possible to use a plurality of purification stages. The high-pressure circuit (11*) may separate waxes.

The ethylene which has been separated off in the second separation vessel (9*), which further comprises, inter alia, the major part of the low molecular weight products of the polymerization (oligomers) and the solvent, is worked up in the low-pressure circuit (14*) at an absolute pressure of from about 0.1 MPa to 0.5 MPa in a plurality of separators with a heat exchanger being installed between each of the separators. FIG. 1 shows two purification stages consisting of heat exchangers (15*) and (17*) and separators (16*) and (18*). It is however also possible to use one purification stage or more than two purification stages. The low-pressure circuit (14*) may separate oil and waxes.

To ensure an efficient preparation of ethylene polymers, the tubular reactor has to withstand the extreme internal tensions when the reaction conditions within the system change. When the manufacturing plant is started or shut down, reaction conditions change drastically within a short time. This may be due because reaction gas is inserted or because no more reaction gas is supplied. Furthermore, when it is needed to open the pressure relief valves, these valves have also to withstand extreme conditions. With the present disclosure, a reactor design was found that uses spatially separated vertical layers of meandering pipelines, wherein at least two of the layers have at least one pressure relief valve connected to a pipeline. It was found that this design is well suited to withstand the conditions as discussed above.

The present disclosure relates to a manufacturing plant for high-pressure ethylene comprising a layered tubular reactor, said layered tubular reactor comprising interconnected first tubings for conveying a high-pressure reaction mixture, which form at least one meandering first pipeline and have at least one first pressure relief valve connected to said first pipeline, and the layered tubular reactor further comprises interconnected second tubings for conveying a high-pressure reaction mixture, which form at least one meandering second pipeline and have at least one second pressure relief valve connected to said second pipeline. The first tubings are straight first tubes or first bends and the second tubings are straight second tubes or second bends. The at least one first pipeline is arranged in a first vertical layer, and the at least one second pipeline is arranged in a second layer, wherein the first layer is spatially separated from the second layer.

In an embodiment, the first layer is separated from the second layer in such a way that the distance between the centers of the first straight tubes and the centers of the second straight tubes is at least 1.5 fold as large, or from 3 times to 20 times as large, as the average outer diameter of the first and/or second straight tubes including the cooling jackets.

In some embodiments, the manufacturing plant further comprises interconnected third tubings for conveying a high-pressure reaction mixture, which form at least one meandering third pipeline and the least one third pipeline is arranged in a third layer. At least one third pressure relief valve may be connected to said third pipeline. In some embodiments, the manufacturing plant further comprises interconnected fourth tubings for conveying a high-pressure reaction mixture, which form at least one meandering fourth pipeline and the least one fourth pipeline is arranged in a fourth layer. At least one fourth pressure relief valve may be connected to said fourth pipeline. In some embodiments, the manufacturing plant further comprises interconnected fifth tubings for conveying a high-pressure reaction mixture, which form at least one meandering fifth pipeline and the at least one fifth pipeline is arranged in a fifth layer. At least one fifth pressure relief valve may connected to said fifth pipeline. In an embodiment, all layers are spaced at a distance from the other layer. The third layer may be spaced at a distance from the first, second and optional third, fourth and fifth layers, and/or the fourth layer may be spaced at a distance from the first, second, third and optional fourth and fifth layers.

It was found that with arranging the tubular reactor in multiple vertical layers, not only is a safe and reliable production of ethylene polymer possible but also the length of the reactor can relatively easily be extended if needed, resulting in prolonged or additional reaction zones. With tubular reactors of a common design, this would require a very complex change of the whole design In one embodiment, the first layer and the second layer are arranged next to each other and/or side by side. However, it is also possible in accordance with the present disclosure to arrange a third and/or fourth layers and/or any additional layers between the first and second layers. In an embodiment, the first and the second layer are the only layers with pressure relief valves and any in-between layers, e.g. the third, fourth and/or fifth layer, have no such pressure relief valves. Such a system is cheap and sufficiently reliable. However, it was found that a system in which in each layer at least one pressure relief valve is connected to a pipeline is particularly safe.

In one embodiment, the first layer is a layer arranged at the beginning of the reaction zones and the second layer is a last layer. Additional third, fourth and/or fifth layers may be arranged between said first and second layers.

All layers of the manufacturing plant may be spatially separate from each other. In an embodiment, all layers are arranged in parallel.

In some embodiments, at least some of the first bends, or all of the first bends, connect straight first tubes arranged at different distances from the flooring, and/or at least some of the second bends, or all of the second bends, connect straight second tubes arranged at different distances from the flooring. This allows for an efficient arrangement within the vertical layer.

The first tubings may have a first average tubing inside diameter and a first average tubing outside diameter and the first bends are shaped in a semicircle having a first centerline radius, wherein the first centerline radius is not more than the tenfold of the first average tubing inside diameter, or not more than the eightfold of the first average tubing inside diameter, or not more than the fivefold of the first average tubing inside diameter. The second tubings may have a second average tubing inside diameter and a second average tubing outside diameter and the second bends are shaped in a semicircle having a second centerline radius, wherein the second centerline radius is not more than the tenfold of the second average tubing inside diameter, or not more than the eightfold of the second average tubing inside diameter, or not more than the fivefold of the second average tubing inside diameter.

The first tubings may intersect a first plane along their tube cavities for conveying a reaction mixture and/or the second tubes intersect a second plane along their tube cavities for conveying a reaction mixture. In an embodiment, any other layers as described above, e.g. the third, fourth and fifth layers, intersect a plane along their tube cavities for conveying a reaction mixture as well. In principle, it is possible to introduce slight curvatures into layers. However, it was found that a flat design results in a good combination of stability, cost and space requirement when a layered design as discussed above is used.

The number of bends in each pipeline may vary. In some embodiments, the pipelines have at least three bends, or at least four bends, or from three to 25 bends. In an embodiment, the pipelines have tubes arranged at at least four different distances from the flooring, or at at least five different distances from the flooring, or at from four to 26 different distances from the flooring.

In some embodiments, each layer has 5 to 50 bends, or 10 to 25 bends, and each layer may have tubes arranged at 6 to 51, or at 11 to 26 different distances from the flooring.

In an embodiment, the flooring is essentially horizontal. The first and the second layers are oriented vertically, i.e. parallel to the force of gravitation at the place of the manufacturing plant. An orientation as described above is to be assumed when the divergence from an exact vertical orientation is not more than 10°, or not more than 5°, or not more than 1°. The first and/or second layers are may be oriented orthogonally to the flooring, i.e. there is no intentional divergence from the orthogonal orientation.

In some embodiments, all layers, i.e. the first, the second, the third, the fourth, and the fifth layers, are connected to each other by transit pipes, for example the first to the second layer by a first transit pipe, the second to the third layer by a second transit pipe, the third to the fourth layer by a third transit pipe, and the fourth to the fifth layer by a fourth transit pipe. Of course, less and more than five layers are possible. Layers that are arranged next to each other and/or side by side may be connected to each other by respective transit pipes, or in such a way that the reaction mixture can be conveyed from one layer to the next layer.

In an embodiment of the present disclosure, some or all layers comprise more than one pipeline. A pipeline is one consecutive segment of the tubular reactor which is arranged in one layer and which is not interrupted by a connection to a pressure relieve valve or an initiator feeding point. Thus, a pipeline within the present disclosure is part of the tube of the tubular reactor thus being designed and configured to convey the reaction mixture while the ethylene-comonomer mixture is reacting to an ethylene polymer. In some embodiments, the first layer has two or three first pipelines that are arranged one above another within the first layer. In some embodiments, the second layer has two or three second pipelines that are arranged one above another within the second layer. In some embodiments, the third layer has two or three third pipelines that are arranged one above another within the third layer. In some embodiments, the fourth layer has two or three fourth pipelines that are arranged one above another within the fourth layer. It is also possible to have different reaction zones within a single layer. However, different pipelines may also contain the same reaction zone.

Pipelines within a layer may be connected with other pipelines within the same layer, but also a connection from outside the layer may connect to said pipelines. This may be a connection running through an external pressure release device or a connection that comes from a different layer. Further, layers that are arranged next to each other and/or side by side may be connected to each other by one transit pipe, or there may be more than one transit pipe connecting the more than one pipelines in the layers.

In an embodiment of the present disclosure, the manufacturing plant further comprises interconnected pre-heating tubings for conveying a high-pressure reaction gas composition which form at least one meandering pre-heating pipeline and the pre-heating pipeline is arranged in a layer comprising a pre-heating zone. At least one pre-heating pressure relief valve may be connected to said pre-heating pipeline. In an embodiment, the at least one meandering pre-heating pipeline forms a separated pre-heating layer.

In a embodiment of the present disclosure, the manufacturing plant includes a post reactor cooler and further comprises interconnected cooling tubings for conveying a high-pressure reaction mixture which form at least one meandering cooling pipeline, and the cooling pipeline is arranged in a layer comprising a cooling zone. At least one cooling pressure relief valve may be connected to said cooling pipeline. In an embodiment, the at least one meandering cooling pipeline forms a separated cooling layer. In another embodiment of the present disclosure, the manufacturing plant does not comprise a separated cooling layer and the at least one meandering cooling pipelines are part(s) of another layer. In an embodiment, the first layer includes a first cooling line for cooling the reaction mixture after the reaction mixture leaves the last of the reaction zones. The first cooling line may be arranged further away from the flooring than the at least one first pipeline, or all first pipelines if more than one is present. In another embodiment, the second layer also has a second cooling line for cooling the reaction mixture after the reaction mixture leaves the last of the reaction zones. The second cooling line may be arranged further away from the flooring than the at least one second pipeline, or all second pipelines if more than one is present. In another embodiment, the third layer also has a third cooling line for cooling the reaction mixture after the reaction mixture leaves the last of the reaction zones. The third cooling line may arranged further away from the flooring than the at least one third pipeline, or all third pipelines if more than one is present. In another embodiment, the fourth layer also has a fourth cooling line for cooling the reaction mixture after the reaction mixture leaves the last of the reaction zones. The fourth cooling line may be arranged further away from the flooring than the at least one fourth pipeline, or all fourth pipelines if more than one is present. The first, second, third and/or fourth cooling lines may be connected to each other by transit cooling pipes, or all cooling lines present in the embodiment. In an embodiment, the aforementioned cooling lines are meandering cooling lines arranged within the respective layers. It was found that the mounting of the cooling lines above the pipelines comprising the reaction zones allows a very efficient arrangement of the tubings of the manufacturing plant.

The pressure relief valves can be connected to the pipelines in any manner. The pressure relief valves can be installed at tubings which branch off the pipelines, or the pressure relief valves are installed in a manner that the reaction mixture passes the pressure relief valve; that means, the reaction mixture comes from one pipeline of one layer of the layered tubular reactor, passes the pressure relief valve and is conveyed to another pipeline, which is either located within the same layer as the pipeline preceding the pressure relief valve or which is located within another layer than the pipeline preceding the pressure relief valve. In an embodiment, the pressure relief valves are preceded and succeeded by pipelines which are located within one layer of the layer tubular reactor. The tubular reactor may be spatially arranged in a manner that the pressure relief valves are connected to pipelines which are located in lower parts of the respective layers. It is further possible that two or more pressure relief valves are connected to pipelines located within one layer. For example, two or more first pipelines that can be connected to two different first pressure relief valves, or two or more second pipelines are connected to two different second pressure relief valves, or two or more third pipelines are connected to two different third pressure relief valves, or two or more fourth pipelines are connected two different fourth pressure relief valves, or two or more fifth pipelines are connected to two different fifth pressure relief valves. Therefore, each layer that is built in this manner has a particularly efficient pressure relief and the pressure relief valves can be secured to the flooring. A reaction mixture coming from one first pipeline may be lead through a first pressure relief valve to another first pipeline within the same layer.

In some embodiments, the first pressure relief valve comprises a first support structure, such as a first pedestal, that is fastened to the flooring and/or the second pressure relief valve comprises a second support structure, such as a second pedestal, that is fastened to the flooring. Also the third and fourth pressure relief valves, or all pressure relief valves within the layered tubular reactor, may be secured to the flooring by such support structures, or by third, fourth and/or fifth support structures, such as pedestals, for third, fourth and/or fifth pressure relief valves. It was found that with the present reactor design it is possible and sufficient to provide pressure relief valves at the bottom, i.e. pressure relief valves secured to the flooring. Common designs of tubular high-pressure reactors often require relieves valves high above the flooring that are fastened or part of the pipelines as the tubing system is long and pressure release at the bottom is not sufficient. The use of pressure relief valves comprising support structures, such as pedestals that are directly secured to the flooring, provides that vibrations are better absorbed and the pressure relief valves can better sustain the forces of an emergency shut-down. In some embodiments, the flooring is not prone to significant vibrations; it may be a concrete floor. Thus, if the pressure relief valves are fastened directly to said flooring, the relief valves are secured better against vibrations or shock. With the layered structure of the present disclosure, reactor design in which the first and the second pressure relief valve, or all pressure relief valves, are placed at the bottom can easily be accomplished.

In some embodiments, the first and second support structures comprise or are concrete slabs and/or metal plates anchored to the flooring of the chamber, or a support structure that is a pedestal comprising at least one concrete slab and/or at least one metal plate, or both a concrete slab and at least one metal plate. The third, fourth and fifth support structures may also comprise or be concrete slabs and/or metal plates anchored to the flooring of the chamber, or support structures that are pedestals each comprising at least one concrete slab and/or at least one metal plate, or both a concrete slab and at least one metal plate. It was found that such structures are less prone to vibrations and tightly secure the pressure relief valves. Said support structures can be used to form fixed-point pressure relief valves as discussed hereinafter.

In an embodiment, at least one of the pressure relief valves is fastened to the flooring in such a way that any movement is prevented. Such an immobile pressure relief valve tightly connected to the flooring may also be called a fixed-point pressure relief valve. In an embodiment, each layer, such as the first and the second layer, is connected to at least one fixed-point pressure relief valve or at least one fixed pressure control valve. In one embodiment, the first and/or the second pressure relief valve is such a fixed-point pressure relief valve, i.e. a first fixed-point pressure relief valve and/or a second fixed-point pressure relief valve. Also, the third, fourth and fifth pressure relief valve may be such a fixed-point pressure relief valve.

In an embodiment, the one or more first pipelines are connected to a first scaffold anchored to the flooring and the one or more second pipelines are connected to the first or to a second scaffold anchored to the flooring, wherein the first and the second pressure relief valve are spaced apart from said first scaffold and/or second scaffold.

In an embodiment, the first and the second pressure relief valves are connected to a pressure-relief compartment comprising a cooling agent, such as water. In case of an emergency shut-down, reaction mixture released through the pressure relief valves may be quenched by water for cooling before a resulting gas is released. Also, the polymers can be retained in this way. The pressure-relief compartment may have a vent that may be a chimney.

In an embodiment, at least one layer is connected to a pressure control valve. In one embodiment, the pressure control valve is fixed to the flooring, for example in such a way that any force caused by the pipelines, e.g. due to thermal expansion or contraction or due to an explosion or combustion, is absorbed.

In an embodiment, the first layer has an upper end pointing away from the flooring as well as a lower end pointing towards the flooring, and a first side end, which is closer to the first pressure relief valve and/or connected to the first pressure relief valve, or to the above mentioned first fixed-point pressure relief valve, and a second side end, which is further away from the stationary first pressure relief valve. The first side end may be constructed as a stationary side end, that means the first tubings at the first side end are tightly mounted and remain essentially in place, even when the temperature increases and/or pressure applies; and the second side end is constructed as an adaptive side end, that means the first tubings at the second side end are mounted in a sliding manner and the first tubings at the second side end can expand and/or stretch further, such as away from the first side end, when the conditions change, for example when the temperature increases and/or pressure applies. In an embodiment, also the second layer has an upper end pointing away from the flooring as well as a lower end pointing towards the flooring, and a first side end, which is closer to the second pressure relief valve and/or connected to the second pressure relief valve, or to the above mentioned second fixed-point pressure relief valve, and a second side end, which is further away from the stationary second pressure relief valve. The first side end of the second layer may be constructed as a stationary side end, that means the second tubings at the first side end are tightly mounted and remain essentially in place; and the second side end is constructed as an adaptive side end, that means the second tubings at the second side end are mounted in a sliding manner and the second tubings at the second side end can expand and/or stretch further, such as away from the first side end, when the conditions change.

In one embodiment the third, fourth and/or fifth layer, or all layers, each have a stationary first side end and an adaptive second side end as discussed above. In some embodiments, the upper end of the first layer may have the same distance from the flooring as the upper end of the second, third, fourth and/or fifth layer. It was found that the pressure release valves that are secured to the flooring can be better combined with the described layered design if the other opposing end, i.e. the second side end, is not secured in the same fashion to the flooring. Thus, the second side end is movable or at least more flexible than the first side end, ensuring that when the temperature changes and the layered tubular reactor thus also changes in size, said change can be compensated on the side of the second side end. The second side end may be movable whereas the first side end is immobile in reaction to a temperature change. Fixed-point pressure relief valves can be used to keep the stationary ends immobile.

The tubular reactors may have at least two reaction zones, or from 2 to 6 reaction zones, or from 2 to 5 reaction zones, while the number of reaction zones is given by the number of feeding points for the initiator. In the context of the present disclosure, a reaction zone begins at the position where free-radical initiators such as oxygen and/or peroxides are fed to the tubular reactor.

In some embodiments, the first layer comprises some or all pipelines of a first reaction zone and the second layer comprises some or all pipelines of a second reaction zone. It may also be envisioned that the second layer does not comprise a second reaction zone and continues the first reaction zone.

In some embodiments, the first and/or the second layer comprises pipelines of at least two reaction zones within said layer. In an embodiment, the first layer has only pipelines of one reaction zone, i.e. the first reaction zone, and the second layer continues with pipelines of the first reaction zone and also has pipelines of a second reaction zone.

The present disclosure also relates to a method for carrying out an emergency shutdown in a manufacturing plant as described above comprising the steps of:

I) polymerizing ethylene or copolymerizing ethylene and one or more comonomers at a temperature of 100° C. to 350° C. and a pressure of 110 MPa to 500 MPa, II) stopping the feeding of the reaction gas composition into the first pipeline, and III) reducing the pressure within the one or more first pipelines and the one or more second pipelines using the first pressure relief valve and the second pressure relief valve, wherein the first pressure relief valve and the second pressure relief valve release a reaction mixture comprising ethylene into a pressure-relief compartment having a cooling agent.

Said pressure relief valves fastened to the flooring increase security during the shutting down of the manufacturing plant.

The present disclosure further relates to a process for preparing an ethylene polymer in a manufacturing plant as described above comprising polymerizing ethylene or copolymerizing ethylene and one or more comonomers at a temperature of 100° C. to 350° C. and a pressure of 110 MPa to 500 MPa. The manufacturing plant may comprise a layered tubular reactor, which comprise interconnected first tubings for conveying a high-pressure reaction mixture, where the first tubings are straight first tubes or first bends, wherein the interconnected first tubings form at least one meandering first pipeline and at least one first pressure relief valve is connected to said first pipeline, and the layered tubular reactor further comprises interconnected second tubings for conveying a high-pressure reaction mixture, and where the second tubings are straight second tubes or second bends, wherein the interconnected second tubings form at least one meandering second pipeline and at least one second pressure relief valve is connected to said second pipeline, wherein the at least one first pipeline is arranged in a vertical first layer and the at least one second pipeline is arranged in a vertical second layer, and wherein the first layer is spatially separated from the second layer.

In some embodiments, the above process comprises the steps of:
a) compressing a reaction gas composition,
b) optionally pre-heating said reaction gas composition, such as using the pre-heating pipeline described above,
c) inserting the reaction gas composition into the first layer, wherein a first initiator is added to a first pipeline thereby starting a first reaction zone and resulting in a first reaction mixture of gas and polymer,
d) transferring the first reaction mixture into the second layer, wherein a second initiator is added to a second pipeline, thereby starting a second reaction zone and resulting in a second reaction mixture of gas and polymer, wherein the first reaction mixture of gas and polymer may be passed through a second pipeline, which is part of the first reaction zone, before the second initiator is added,
e) optionally transferring the second reaction mixture of gas and polymer into a third layer, wherein a third initiator is added to a third pipeline, thereby starting a third reaction zone and resulting in a third reaction mixture of gas and polymer, wherein the second reaction mixture of gas and polymer may be passed through a third pipeline, which is part of the second reaction zone, before the third initiator is added,
f) optionally transferring the third reaction mixture of gas and polymer into a fourth layer, wherein a fourth initiator is added to a fourth pipeline, thereby starting a fourth reaction zone and resulting in a fourth reaction mixture of gas and polymer, wherein the third reaction mixture of gas and polymer may be passed through a fourth pipeline, which is part of the third reaction zone, before the third initiator is added,
g) optionally transferring the fourth reaction mixture of gas and polymer into a fifth layer, wherein a fifth initiator is added to a fifth pipeline, thereby starting a fifth reaction zone and resulting in a fifth reaction mixture of gas and polymer, wherein the fourth reaction mixture of gas and polymer may be passed through a fifth pipeline, which is part of the fourth reaction zone, before the fifth initiator is added,
h) transferring the second, third, fourth or fifth reaction mixture of gas and polymer to at least one cooling line, such as the fourth, third, second and/or first cooling lines that are part of the fourth layer, the third layer, the second layer and/or the first layer respectively, and
i) transferring said cooled second, third, fourth or fifth reaction mixture of gas and polymer to a high-pressure separator, and separating residual gas from the polymer.

Other embodiments of the process comprises the steps of:
a') compressing a reaction gas composition,
b') optionally pre-heating said reaction gas composition, for example using the pre-heating pipeline described above,
c') inserting the reaction gas composition into the first layer, wherein a first initiator is added to a first pipeline, thereby starting a first reaction zone and resulting in a first reaction mixture of gas and polymer,
d') optionally transferring the first reaction mixture of gas and polymer into a third layer, wherein a third initiator is added to a third pipeline, thereby starting a third reaction zone and resulting in a third reaction mixture of gas and polymer, wherein the second reaction mixture of gas and polymer may be passed through a third pipeline, which is part of the second reaction zone, before the third initiator is added,
e') optionally transferring the third reaction mixture of gas and polymer into a fourth layer, wherein a fourth initiator is added to a fourth pipeline, thereby starting a fourth reaction zone and resulting in a fourth reaction mixture of gas and polymer, wherein the third reaction mixture of gas and polymer may be passed through a fourth pipeline, which is part of the third reaction zone, before the third initiator is added,
f') optionally transferring the fourth reaction mixture of gas and polymer into a fifth layer, wherein a fifth initiator is added to a fifth pipeline, thereby starting a fifth reaction zone and resulting in a fifth reaction mixture of gas and polymer, wherein the fourth reaction mixture of gas and polymer may be passed through a fifth pipeline, which is part of the fourth reaction zone, before the fifth initiator is added,
g') transferring the third, fourth or fifth reaction mixture into a second layer, wherein a second initiator is added to a second pipeline, thereby starting a second reaction zone and resulting in a second reaction mixture of gas and polymer, wherein the first reaction mixture of gas and polymer may be passed through a second pipeline, which is part of the first reaction zone, before the second initiator is added,
h') transferring the second reaction mixture of gas and polymer to at least one cooling line, such as the fourth, third, second and/or first cooling lines that are part of the fourth layer, the third layer, the second layer and/or the first layer respectively, and
I') transferring said cooled second reaction mixture of gas and polymer to a high-pressure separator, and separating residual gas from the polymer.

The process for manufacturing LDPE and/or the method for emergency shutdown may be carried out in a manufacturing plant as described within this disclosure. The manufacturing plant may be a manufacturing plant as described in detail above. It was found that the above described benefits of the manufacturing plant apply for this process for manufacturing LDPE and/or the method for emergency shutdown.

Figure 2:
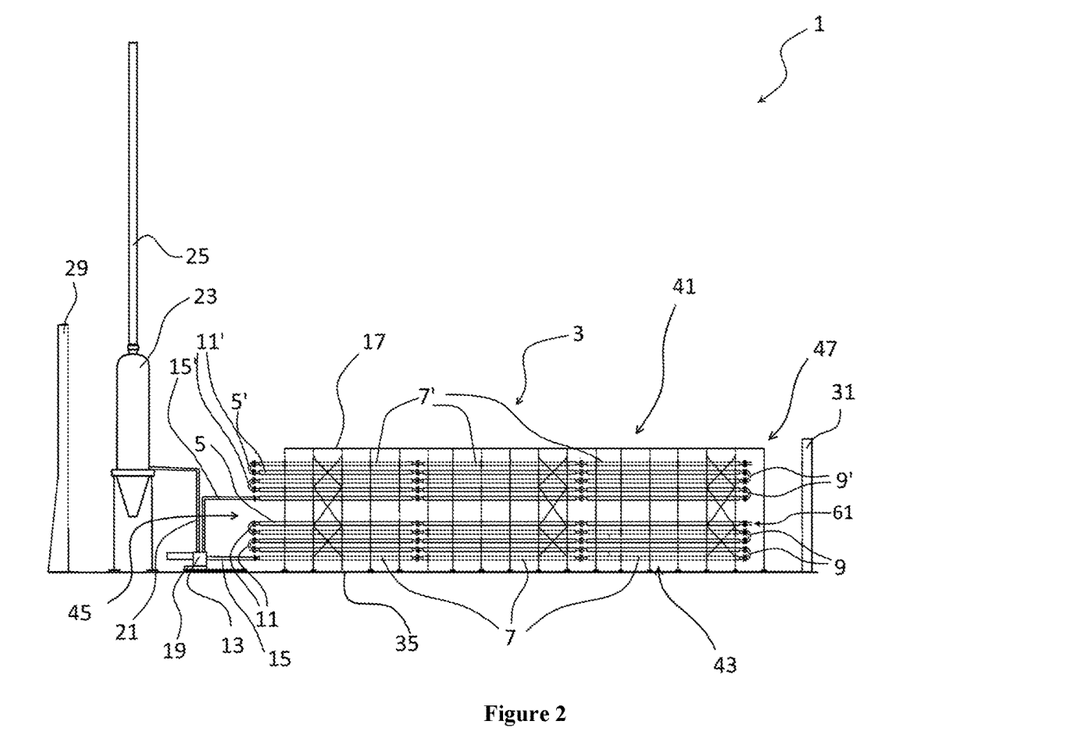
FIG. 2 shows schematically a vertical cross-section of a manufacturing plant according to the present disclosure.

FIG. 2 shows a vertical cross-section of a manufacturing plant (1) for high-pressure ethylene polymerization comprising a layered tubular reactor, which is situated within a chamber comprising a flooring (35), a first wall (29) and an opposing second wall (31). The layered tubular reactor comprises interconnected first tubings (7, 7', 9, 9', 11, 11') for conveying a high-pressure reaction mixture. The first tubings (7, 7', 9, 9', 11, 11') form two meandering first pipelines (5, 5'), wherein one first pipeline (5) is closer to the flooring than the other first pipeline (5'), and have one first pressure relief valve (13) connected to said first pipelines (5, 5'). The layered tubular reactor also comprises interconnected second tubings for conveying a high-pressure reaction mixture forming at least one meandering second pipeline that is not shown in FIG. 1. The two pipelines (5, 5') are arranged one above the other in a first vertical layer (3). The first tubings comprise straight first tubes (7, 7') and first bends (9, 9', 11, 11'), wherein the first bends (9, 9', 11, 11') connect first tubes (7, 7') which are arranged at different distances from the flooring (35).

A first pressure relief valve (13) is connected by pipes (15, 15') to the upper and the lower first pipelines (5, 5') and by another pipe (21) to a pressure-relief compartment (23) comprising water as cooling agent and a vent (25).

The first pressure relief valve (13) comprises a first support structure (19) that is fastened to the flooring (35), wherein said first support structures comprise a concrete slab and a metal plate anchored to said flooring (35).

A compressed and pre-heated reaction gas composition enter the pipeline (5) at position (61), where also initiator is fed to the reaction gas composition (not shown). The resulting reaction mixture leaves pipeline (5) through pipe (15), passes the first pressure relief valve (13) and enter the pipeline (5') through pipe (15'). In case the first pressure relief valve (13) opens, the reaction mixture contained in first pipelines (5, 5') may be expanded into the pressure-relief compartment (23) via pipe (21).

The first layer has an upper end (41) pointing away from the flooring (35) as well as a lower end (43) pointing towards the flooring and a stationary first side end (45) and an adaptive second side end (47), wherein the stationary first side end (45) is closer to the first pressure relief valve (13), wherein the adaptive second side end (47) is mounted in such a way that it can expand and/or stretch further than the stationary first side end (45) when temperature increases. The first pipelines (5, 5') are mounted on a metal framework (17).

Figure 3:
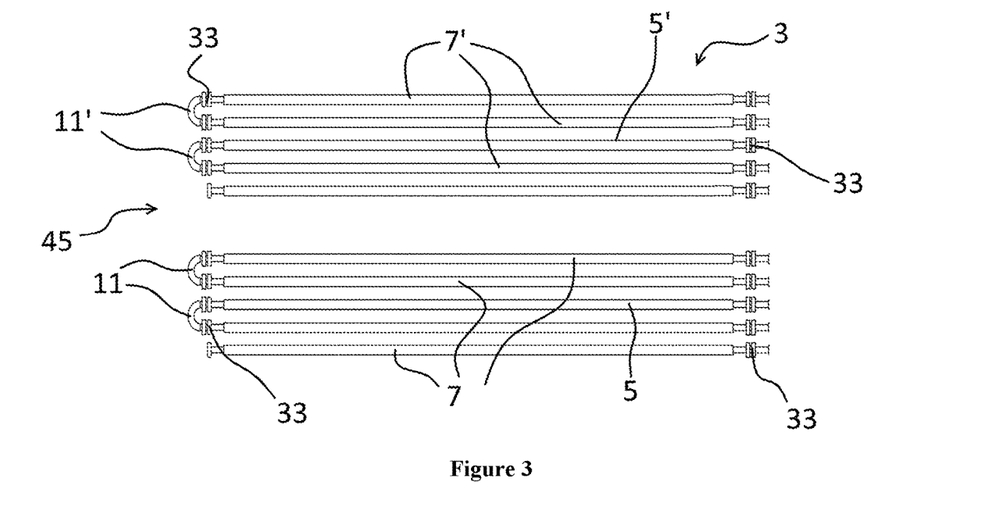
FIG. 3 shows schematically an enlarged part of the cross-section shown in FIG. 2.

FIG. 3 shows a section of the first pipelines (5, 5') of the first layer (3) depicted in FIG. 2, namely the section of the first side end (45). Bends (11, 11') and straight first tubes (7, 7') and different straight first tubes (7, 7') are interconnected terminally by first pressure flange joints (33).

Although FIGS. 2 and 3 describe the first layer, it should be understood that other layers, such as the pre-heating layer, the second layer, the third layer, the fourth layer and/or the fifth layer, may be built identically or similarly, i.e. with meandering pipelines in a flat layer. It is possible to add further pipelines—arranged on top of existent pipeline, e.g. for cooling or for further reaction zones. One possible set-up of a combination of layers can be derived from FIGS. 4 and 5.

Figure 4:
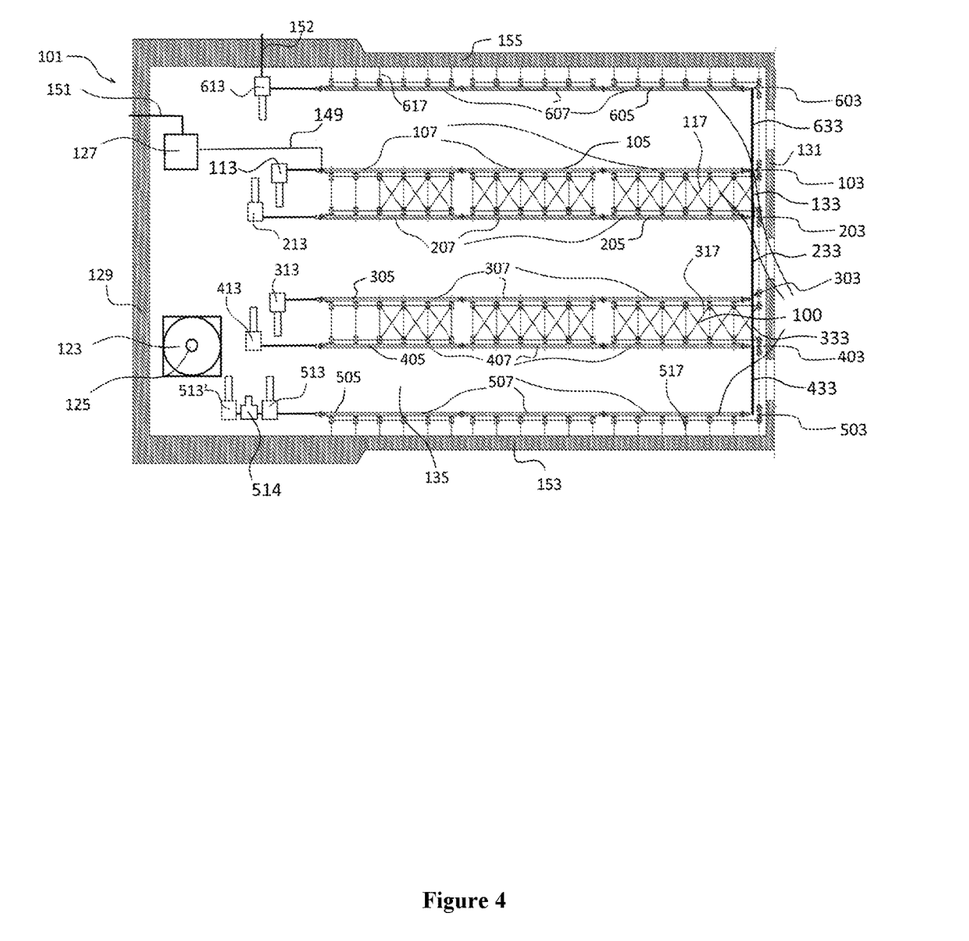
FIG. 4 shows a schematic floor plan a manufacturing plant according to the present disclosure.

FIG. 4 shows a schematic floor plan of a manufacturing plant (101) for high-pressure ethylene polymerization having a chamber comprising a flooring (135), surrounding walls (129, 131, 153, 155) and a vertically layered tubular reactor (100). The layered tubular reactor (100) comprises interconnected first tubings (107) for conveying a high-pressure reaction mixture forming at least one meandering first pipeline (105) and having a first pressure relief valve (113) connected to said first pipeline (105). The layered tubular reactor (100) further comprises interconnected second tubings (207) for conveying a high-pressure reaction mixture forming at least one meandering second pipeline (205) and having a second pressure relief valve (213) connected to said second pipeline (205), wherein the at least one first pipeline (105) is arranged in a vertical first layer (103) and the at least one second pipeline (205) is arranged in a second layer (203), wherein the first layer (103) is spaced at a distance form the second layer (203) and a transit pipe (133) connects said first layer (103) with said second layer (203).

Said manufacturing plant (101) also comprises interconnected third tubes (307) for conveying a high-pressure reaction mixture forming at least one meandering third pipeline (305) and having a third pressure relief valve (313) connected to said third pipeline (305) and wherein the manufacturing plant comprises interconnected fourth tubes (407) for conveying a high-pressure reaction mixture forming at least one meandering fourth pipeline (405) and having a fourth pressure relief valve (413) connected to said fourth pipeline (405) wherein the at least one third pipeline (305) is arranged in a third layer (303) and the fourth pipeline (405) is arranged in a fourth layer (403), wherein the third layer (303) is spaced at a distance form the first, second and fourth layers (103, 203, 403), and the fourth layer (403) is spaced at a distance from the first, second and third layers (103, 203, 303) and wherein a second transit pipe (233) for conveying a high-pressure reaction mixture connects a second pipeline (205) with a third pipeline (305) and a third transit pipe (333) for conveying a high-pressure reaction mixture connects a third pipeline (305) with a fourth pipeline (405). The pressure relief valves (113, 213, 313, 413) may be fixed-point pressure relief valves.

Said manufacturing plant (101) also comprises interconnected fifth tubes (507) for conveying a high-pressure reaction mixture forming at least one meandering fifth pipeline (505) and having a fifth pressure relief valve (513, 513') connected to said fifth pipeline (505) arranged in a fifth layer (503), wherein said fifth layer (503) is spaced at a distance from the first, second, third and fourth layers (103, 203, 303, 403) and a fourth transit pipe (433) for conveying a high-pressure reaction mixture connects the fourth pipeline (205) with the fifth pipeline (405). The fifth pipeline (505) has two fifth pressure relief valves (513, 513') and between the pressure relief valves (513, 513') there is a pressure control valve (514) to maintain the pressure within the above-mentioned pipelines. The pressure control valve (514) may be a fixed-point valve, i.e. a valve fixed to the flooring in an immobile position, and the pressure relief valves (513, 513') are movable in at least one direction, such as a direction parallel to the layers.

The reaction gas composition enters the reactor and the chamber by a pipe (152). The compressor for compressing the reaction gas composition may be arranged inside or outside of the chamber. The compressed reaction gas composition passes through a pressure relief valve (613) before entering a pre-heater having interconnected pre-heating tubes (607) for conveying a high-pressure reaction mixture forming at least one meandering pre-heating pipeline (605) and having the pre-heating pressure relief valve (613) connected to said pre-heating pipeline (605), wherein the at least one pre-heating pipeline (605) is arranged in a pre-heating layer (603) comprising a pre-heating zone. A transit pipe (633) for conveying a high-pressure reaction mixture connects a pre-heating pipeline (605) with a first pipeline (105).

The pipelines are mounted on metal frameworks (117, 317, 517, 617), wherein the first and second pipelines (105, 205) share the same metal framework (117) and the third and fourth pipeline (105, 205) share the same metal framework (317). The first layer (103) is arranged next to and side by side with the second layer (203), the second layer (203) is arranged next to and side by side with the third layer (303), the third layer (303) is arranged next to and side by side with the fourth layer (403), and the fourth layer (403) is arranged next to and side by side with the fifth layer (503).

The pressure relief valves (113, 213, 313, 413, 513, 613) are connected (connections not shown) to a pressure-relief compartment (123) comprising a cooling agent and a vent (125). Also shown is a high-pressure separator (127) into which the reaction mixture is conveyed via a pipe (149) after having passed the layered tubular reactor (100). The polymer is afterwards transmitted by a pipe (151) for further processing to the next station, e.g. an extruder (not shown).

Figure 5:
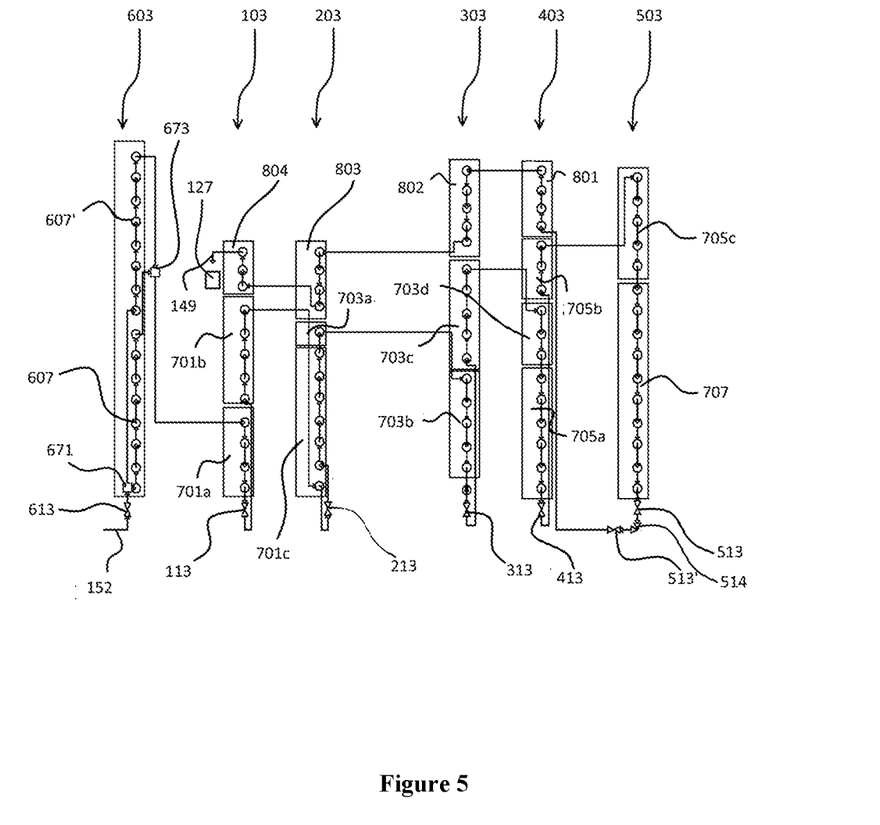
FIG. 5 shows schematically a diagram of the connections in a layered tubular reactor according to the present disclosure.

FIG. 5 relates to a connection diagram of an exemplary embodiment which gives a transverse section through the row of pipes, wherein the top section of FIG. 5 relates to a higher distance from the flooring (not shown) than the bottom section. It should be understood that many other arrangements are possible in accordance with the present disclosure.

FIG. 5 shows a pre-heating layer (603), a first layer (103), a second layer (203), a third layer (303), a fourth layer (403), and a fifth layer (503). A compressed reaction gas composition enters the reactor and the chamber by a pipe (152), and runs through a pressure relief valve (613) before entering the pre-heating layer (603). The reaction gas composition is split at a junction (671) and runs through two pre-heating pipelines (607, 607') installed in parallel. Afterwards the gas flows are recombined at a merger (673) and inserted into the first layer (103). The reaction gas composition is lead out of the first layer through a first pressure relief valve (113) and reinserted into the first layer (103). Two adjacent first pipelines, which are both part of a first reaction zone, (701a, 701b) are separated by the first pressure relief valve (113). Afterwards the resulting reaction mixture is transferred into the second layer (203) passing through a second pressure relief valve (213) and entering a second pipeline (701c), which is still part of a first reaction zone. A second reaction zone begins in an upper section of the second layer (203) in an adjacent second pipeline (703a). The reaction mixture is then transferred into the third layer (303) in a third pipeline (703b), which is still part of a second reaction zone. The reaction mixture is lead out of the third layer (303) through a third pressure relief valve (313) and reinserted into the third layer (303) in another third pipeline (703c) which is part of a second reaction zone. Also, the fourth pipeline (703d) within the fourth layer (403), into which the reaction mixture is subsequently transferred, is part of a second reaction zone. The following fourth pipeline (705a) is part of a third reaction zone. Subsequently, the reaction mixture is lead out of the fourth layer (403), passed through a fourth pressure relief valve (413), and reinserted into a fourth layer (403) in a fourth pipeline (705b), which is part of a third reaction zone. Also, the fifth pipeline (705c) within the fifth layer (503), into which the reaction mixture is subsequently transferred, is part of a third reaction zone. An adjacent fifth pipeline (707) forms a fourth reaction zone (707). Initiator is always fed at the beginning of the respective reaction zones.

Having passed the reaction zones, the reaction mixture is lead through two fifth pressure relief valves (513, 513') into an aftercooler. Between said pressure relief valves (513, 513'), the pressure control valve (514) is installed. The aftercooler has a first cooling line (804), a second cooling line (803), a third cooling line (802) and a fourth cooling line (801), wherein the reaction mixture first enters the fourth cooling line (801), then the third cooling line (802), then the second cooling line (803) and last the first cooling line (804) before being transmitted through a pipe (149) into a high-pressure separator (127).

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

What is claimed is:

1. A manufacturing plant for high-pressure ethylene polymerization comprising a layered tubular reactor,
   the layered tubular reactor comprising interconnected first tubings for conveying a high-pressure reaction mixture, wherein the first tubings are straight first tubes or first bends, wherein the interconnected first tubings form at least one meandering first pipeline and at least one first pressure relief valve is connected to said first pipeline,
   the layered tubular reactor further comprising interconnected second tubings for conveying a high-pressure reaction mixture, wherein the second tubings are straight second tubes or second bends, wherein the interconnected second tubings form at least one meandering second pipeline and at least one second pressure relief valve is connected to said second pipeline,
   wherein the at least one first pipeline is arranged in a vertical first layer and the at least one second pipeline is arranged in a vertical second layer, and
   wherein the first layer is spatially separated from the second layer.

2. The manufacturing plant of claim 1, wherein the manufacturing plant has a flooring and the first pressure relief valve is attached to a first support structure which is fastened to the flooring and/or wherein the second pressure relief valve is attached to a second support structure which is fastened to the flooring.

3. The manufacturing plant of claim 2, wherein the first and second support structures comprise or are concrete slabs and/or metal plates anchored to said flooring.

4. The manufacturing plant of claim 1, wherein at least some of the first bends connect straight first tubes arranged at different distances from the flooring and/or wherein at least some of the second bends connect straight second tubes arranged at different distances from the flooring.

5. The manufacturing plant of claim 1, wherein the first tubings have a first average tube inside diameter and the first bends are shaped in a semicircle having a first centerline radius, wherein the first centerline radius is not more than the tenfold of the first average tube inside diameter and/or
   the second tubings have a second average tube inside diameter and the second bends are shaped in a semicircle having a second centerline radius, wherein the second centerline radius is not more than the tenfold of the second average tube inside diameter.

6. The manufacturing plant of claim 1, wherein a transit pipe for conveying a high-pressure reaction mixture connects the first layer with the second layer and the first layer and the second layer are arranged side by side and/or next to each other.

7. The manufacturing plant of claim 1, wherein the first tubings intersect a first plane along their cavities for conveying a reaction mixture and/or the second tubings intersect a second plane along their tube cavities for conveying a reaction mixture.

8. The manufacturing plant of claim 1, wherein the one or more first pipelines are connected to a first scaffold anchored to the flooring and the one or more second pipelines are connected to the first scaffold or to a second scaffold anchored to the flooring, wherein the first pressure relief valve and the second pressure relief valve are spaced apart from said first scaffold and/or second scaffold.

9. The manufacturing plant of claim 1, wherein the first pressure relief valve and the second pressure relief valve are connected to a pressure-relief compartment comprising a cooling agent and a vent.

10. The manufacturing plant of claim 1, wherein the manufacturing plant further comprises interconnected third tubings for conveying a high-pressure reaction mixture and the interconnected third tubings form at least one meandering third pipeline, and wherein the manufacturing plant also comprises interconnected fourth tubings for conveying a high-pressure reaction mixture and the interconnected fourth tubings form at least one meandering fourth pipeline,
wherein the at least one third pipeline is arranged in a third vertical layer and the at least one fourth pipeline is arranged in a fourth vertical layer,
wherein the third layer is spaced at a distance from the first, second and fourth layer, and the fourth layer is spaced at a distance from the first, second and third layer.

11. The manufacturing plant of claim 1, wherein the first layer has an upper end pointing away from the flooring as well as a lower end pointing towards the flooring and a stationary first side end and an adaptive second side end, wherein the stationary first side end is closer to the first pressure relief valve than the adaptive second side end and/or one first tubing located at the stationary first side end is connected to the first pressure relief valve,
wherein the adaptive second side end is mounted in such a way that it can expand and/or stretch away from the stationary first side end when the temperature increases.

12. The manufacturing plant of claim 1, further comprising a pre-heater having interconnected pre-heating tubings for conveying a high-pressure reaction gas composition, wherein the pre-heating tubings are straight pre-heating tubes or pre-heating bends, wherein the interconnected pre-heating tubings form a pre-heating pipeline and at least one pre-heating pressure relief valve is connected to said pre-heating pipeline,
wherein the pre-heating pipeline is arranged in a vertical pre-heating layer comprising a pre-heating zone,
wherein the pre-heating pressure relief valve is attached to a pre-heating support structure that is fastened to the flooring.

13. The manufacturing plant of claim 1, wherein the first layer comprises pipelines of at least one first reaction zone and the second layer comprises pipelines of at least one second reaction zone.

14. A method for carrying out an emergency shutdown in the manufacturing plant of claim 1, comprising the steps of
I) polymerizing ethylene or copolymerizing ethylene and one or more comonomers at a temperature of 100° C. to 350° C. and a pressure of 110 MPa to 500 MPa,
II) stopping the feeding of the reaction gas composition into the first pipeline,
III) reducing the pressure within the one or more first pipelines and the one or more second pipelines using the first pressure relief valve and the second first pressure relief valve, wherein the first pressure relief valve and the second pressure relief valve release a reaction mixture comprising ethylene into a pressure-relief compartment having a cooling agent.

* * * * *

UNITED STATES PATENT AND TRADEMARK OFFICE
CERTIFICATE OF CORRECTION

PATENT NO. : 10,343,135 B1
APPLICATION NO. : 16/144627
DATED : July 9, 2019
INVENTOR(S) : Littmann et al.

Page 1 of 1

It is certified that error appears in the above-identified patent and that said Letters Patent is hereby corrected as shown below:

In the Specification

In Column 1, Line 48, delete "rectors" and insert -- reactors --
In Column 1, Line 54, delete "rector" and insert -- reactor --
In Column 1, Line 57, delete "rector" and insert -- reactor --
In Column 4, Line 18, delete "describe" and insert -- described --
In Column 4, Line 18, after "describe" delete "in the"
In Column 4, Line 47, after "plan" insert -- of --
In Column 5, Line 7, delete "an" and insert -- a --
In Column 11, Line 24, after "may" insert -- be --
In Column 11, Line 37, after "design" insert -- . --
In Column 12, Line 58, delete "relieve" and insert -- relief --
In Column 13, Line 16, delete "pipelines" and insert -- pipeline --
In Column 13, Line 26, delete "a" and insert -- an --
In Column 13, Line 52, after "may" insert -- be --

Signed and Sealed this
Twenty-sixth Day of July, 2022

Katherine Kelly Vidal
*Director of the United States Patent and Trademark Office*